Dec. 18, 1962 W. M. BROBECK 3,069,171

PHONOGRAPH RECORD PLAYER AND CHANGER

Filed June 15, 1959 7 Sheets-Sheet 1

INVENTOR
WILLIAM M. BROBECK
BY
Carl Hoppe

Dec. 18, 1962 W. M. BROBECK 3,069,171

PHONOGRAPH RECORD PLAYER AND CHANGER

Filed June 15, 1959 7 Sheets-Sheet 2

INVENTOR
WILLIAM M. BROBECK
BY

Dec. 18, 1962 W. M. BROBECK 3,069,171

PHONOGRAPH RECORD PLAYER AND CHANGER

Filed June 15, 1959 7 Sheets-Sheet 3

INVENTOR
WILLIAM M. BROBECK
BY
Carlstopher

Dec. 18, 1962 W. M. BROBECK 3,069,171

PHONOGRAPH RECORD PLAYER AND CHANGER

Filed June 15, 1959 7 Sheets-Sheet 4

INVENTOR
WILLIAM M. BROBECK
BY Carl Hoppe

Dec. 18, 1962 W. M. BROBECK 3,069,171

PHONOGRAPH RECORD PLAYER AND CHANGER

Filed June 15, 1959 7 Sheets-Sheet 5

INVENTOR
WILLIAM M. BROBECK
BY Carl Hoppe

Dec. 18, 1962 W. M. BROBECK 3,069,171

PHONOGRAPH RECORD PLAYER AND CHANGER

Filed June 15, 1959 7 Sheets-Sheet 6

INVENTOR

WILLIAM M. BROBECK

BY [signature]

PHONOGRAPH RECORD PLAYER AND CHANGER

Filed June 15, 1959 7 Sheets-Sheet 7

INVENTOR
WILLIAM M. BROBECK
BY Carl Hoppe 3,069,171
PHONOGRAPH RECORD PLAYER AND CHANGER William M. Brobeck, Orinda, Calif.
(1920 Park Blvd., Oakland, Calif.)
Filed June 15, 1959, Ser. No. 820,234
17 Claims. (Cl. 274—10)

This invention relates generally to devices for playing and changing phonograph records and, more particularly, it relates to improvements in phonograph record players for playing automatically a plurality of disk-type records on both sides in a predetermined sequence.

It is recognized that heretofore devices have been developed for automatically playing both sides of one or more phonograph records; however, among the disadvantages of these devices are their relatively large space requirements and high cost. For this reason such devices are not particularly suited for use in home phonograph units.

Thus, it is one object of this invention to provide a compact and relatively inexpensive phonograph record player and changer suitable for home use for automatically playing both sides of one or more records in a predetermined sequence.

It is another object of this invention to provide an automatic record player and changer for automatically playing various record sides in a sequence that may be predetermined, to accommodate the playing sequence of the various sides of a particular album comprising a single symphonic composition or the like.

A further object of this invention is to reduce record damage frequently a problem in the present drop-type changers, by providing an automatic record changer having means for side loading and unloading the unit and moving the record drive into engagement therewith, rather than dropping the records on a turn-table.

Still another object of this invention is to provide an automatic phonograph record player and changer having a system of interlocks arranged to prevent malfunctioning of the device either during a playing sequence or upon improper insertion of a record.

Other and further objects and advantages of the present invention will become apparent from the following description considered in connection with the accompanying drawings wherein.

Figure 1:
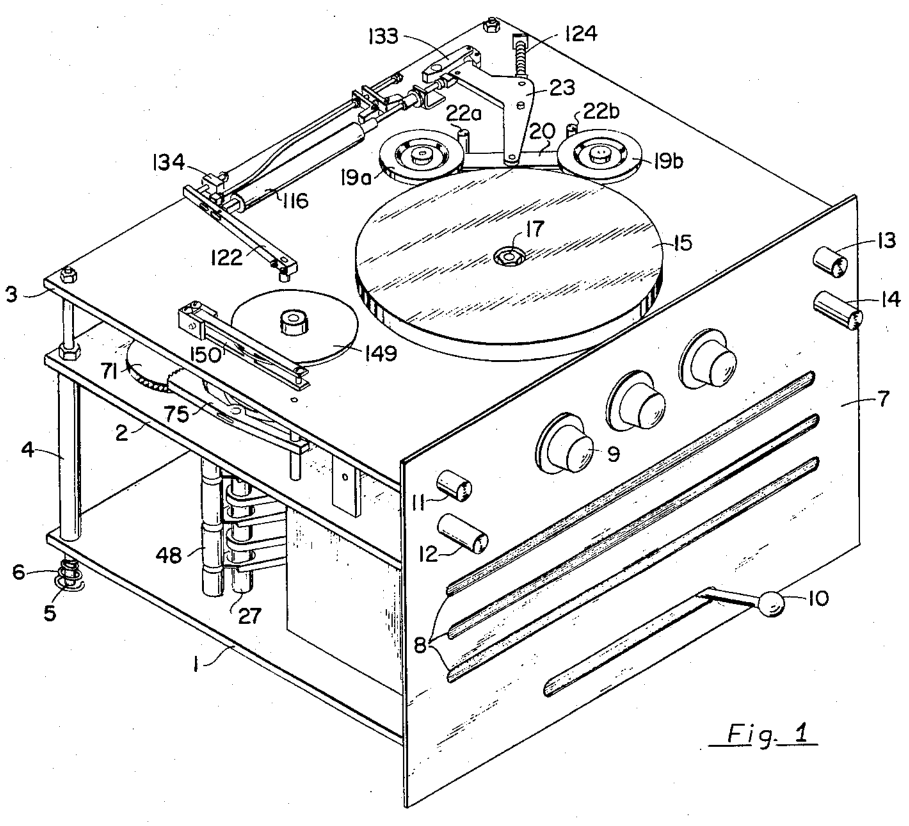
FIG. 1 is a perspective view of the phonograph record player-changer looking downwardly from above the left front corner of the device to illustrate the over-all arrangement of the unit.

The general appearance and assembly of a selected embodiment of the present invention is illustrated in FIG. 1. The supporting structure comprises three rectangular plates, a base plate 1, a center plate 2, and a top plate 3, spaced and supported by four vertical studs 4 at of the four corners. The base plate 1 is provided with pins 5 at each corner surrounded by coil springs 6. These pins fit into suitable apertures in other supporting structures or the cabinet which is to house the record player-changer mechanism and the springs 6 resiliently support the unit. The record change mechanism is located mainly between the top plate 3 and the center plate 2 which are separated about 2 inches, and the records run between the center plate 2 and bottom plate 1 which are separated about 5 inches.

The unit is provided with a front panel 7 having three horizontal slots 8 for insertion of the records. Mounted on the front panel 7 are the various manual control buttons including the record release lever 10 protruding through a slot in the front panel 7, normal and album sequence push-buttons 11 and 12, respectively; and normal and single play reject push-buttons 13 and 14, respectively. Other control buttons 9 may be mounted on the front panel 7 such as pre-amplifier controls, volume controls and the like; but since the present invention concerns only the changer and player mechanism such modifications are not fully described herein.

For ease of understanding, the following description of the mechanism of the present invention is divided into three parts; namely, the record support and drive mechanism, the record change mechanism, and the interlocking and other features.

*Record Support and Drive*

Figure 2:
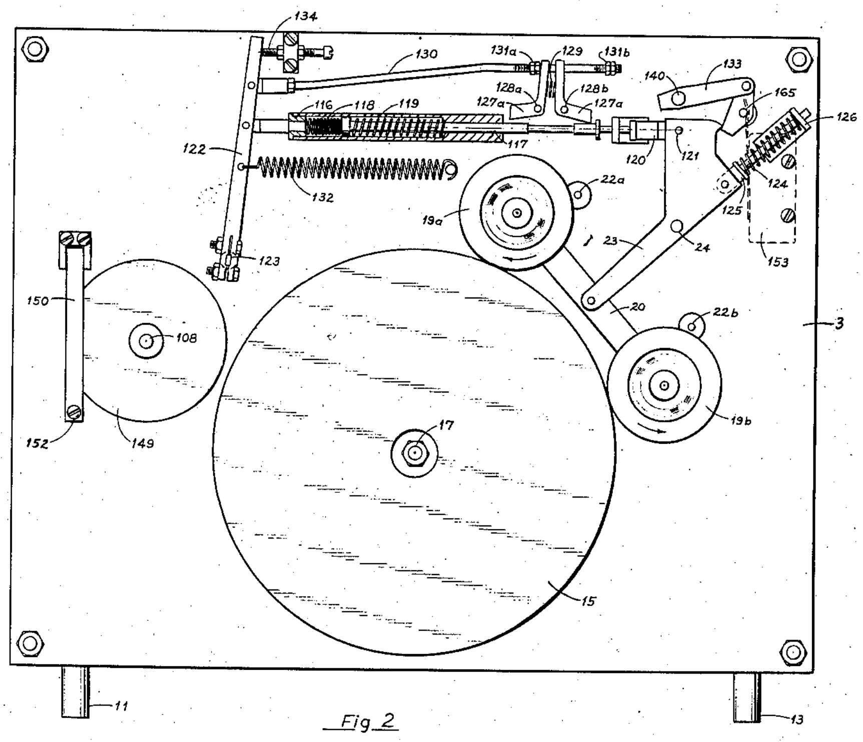
FIG. 2 is a top view of the record player-changer illustrating part of the record drive and reverse mechanism.
Figure 3:
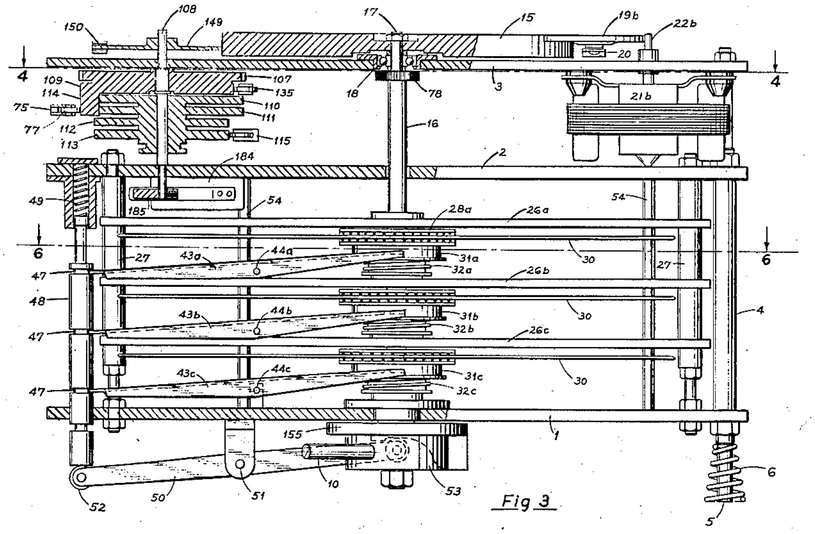
FIG. 3 is a front elevational view with the front panel removed and with some of the device shown partially in section to illustrate the record drive mechanism and part of the sequence control mechanism.

As appears in FIGS. 2 and 3, the top plate 3 supports a flywheel 15 carried on a vertical flywheel shaft 16 extending through the top plate 3 and through the center plate 2. The flywheel 15 is secured to the flywheel shaft 16 at one end by a nut 17, and is supported in a ball thrust bearing 18 mounted on the top plate 3. The flywheel 15 is driven through either one of two idler wheels 19*a* and 19*b*, respectively, rotatably mounted at each extremity of the reverse bar 20. The rims of the idler wheels 19*a* and 19*b* are fabricated from rubber or other resilient material and drive the flywheel 15 by frictional rolling contact therewith. These idler wheels are driven in opposite directions each by a separate motor 21*a* and 21*b*, respectively, by moving each wheel into frictional contact with its corresponding motor spindle 22*a* or 22*b*, respectively.

For this purpose the reverse bar 20 is pivotally supported from the reverse lever 23 which in turn is pivoted as on the pin 24 secured to the top plate 3. It will be apparent that the flywheel 15, and each idler wheel together wiith its respective motor spindle are oriented so that by pivoting the reverse lever 23 about the pin 24 either one or the other of the idler wheels moves into contact both with its respective motor spindle and with the flywheel 15, while at the same time the other idler wheel runs freely without contacting the flywheel 15 or its motor spindle. In this manner the rotation of the flywheel 15 may be reversed by bringing into contact with the flywheel rim the proper idler wheel, 19*a* or 19*b*.

Figure 6:
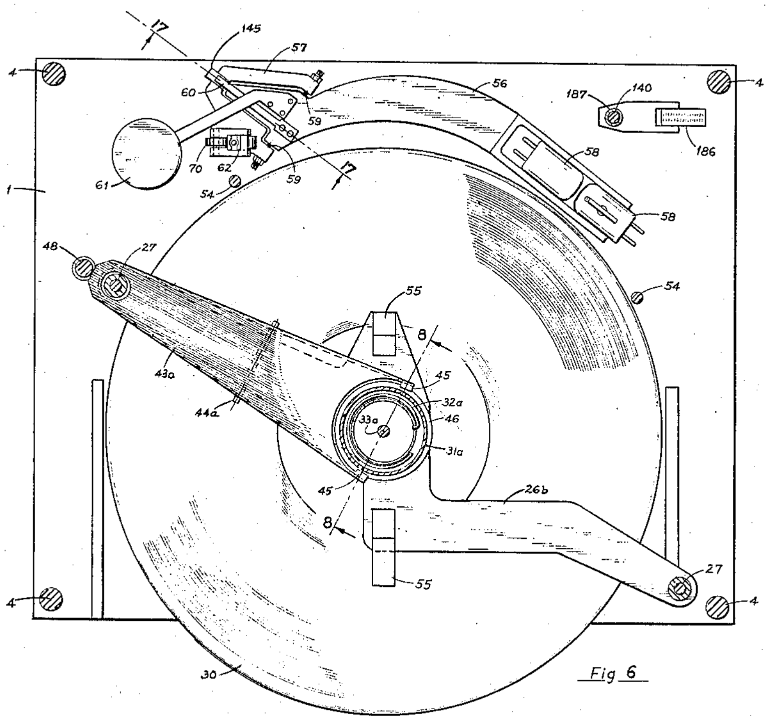
FIG. 6 is a horizontal sectional view taken along line 6—6 of FIG. 3 indicating the pick-up arm and the record support structure.
Figure 8:
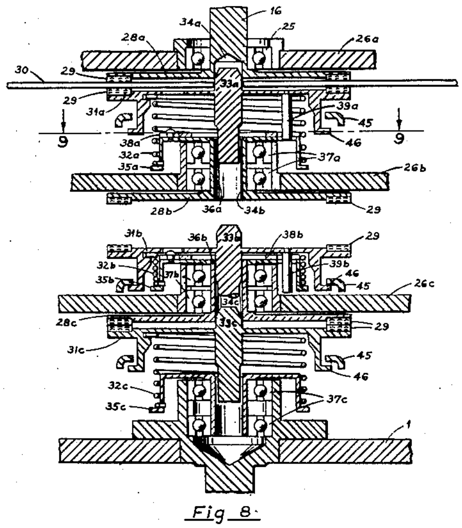
FIG. 8 is a vertical sectional view of the record drive mechanism taken along line 8—8 of FIG. 6 illustrating the various positions of the record drive disks.

The lower end of the flywheel shaft 16 is guided in radial ball bearings 25 mounted on the upper one of three similar dog-leg support bars 26*a*, 26*b*, and 26*c*, respectively, shown more clearly in FIG. 6. The extremities of these bars are fixed to a pair of posts 27 bolted to the center and bottom plates, 2 and 3, respectively. The flywheel shaft 16 carries at its lower end a top record drive disk 28*a* which, as appears in FIG. 8, is provided with a facing 29 of frictional material such as cork to improve its frictional contact with the record 30. The diameter of the drive disk 28*a* is small enough to clear the pick-up arm at its innermost position.

Figure 15:
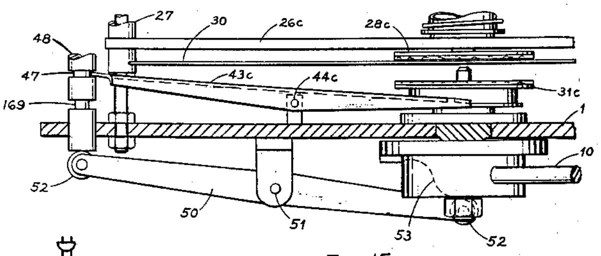
FIG. 15 is a detailed elevational view illustrating the bottom one of the record drive disks in position for insertion of a record.
Figure 26:
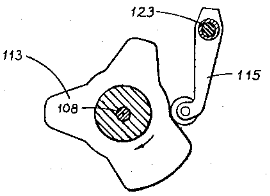

All the records 30 are driven through this first upper record drive disk 28*a* by clamping means hereinafter described, and the direction of rotation of the drive mechanism and records is varied depending on whether the top or bottom face of a particular record is being played. The mechanism is illustrated in the clamped position with all records in place in FIG. 3, whereas the structural details and the various positions of the clamping mechanism are illustrated in FIGS. 8 and 15.

The record drive is accomplished by a plurality of spring-loaded drive disks, 31*a*, 31*b* and 31*c*, each of which grips a record and drives as a unit both the record 30 and lower portions of the drive mechanism itself. In FIG. 8 it will be observed that below the top record 30 is mounted a spring-loaded drive disk 31*a* also having a cork facing 29 and being of similar diameter as the upper record drive disk 28*a*. The lower record drive disk 31*a* is urged upwardly by the spring 32*a* so as to clamp the record 30 in playing position between itself and the upper drive disk 28*a*. The lower drive disk 31*a* carries a pin 33*a* at its center which enters the hole in the center of the record and enters a corresponding hole 34*a* in the flywheel shaft 16 on its axis of rotation. The spring 32*a* reacts against a stepped cup-washer 35*a* carried by a shaft extension 36*a* on the upper record drive disk 28*b* for the center record. The upper drive disk 28*b* for the center record is mounted in thrust and radial ball bearings 37*a* supported from the dog-leg support bar 26*b*.

Figure 9:
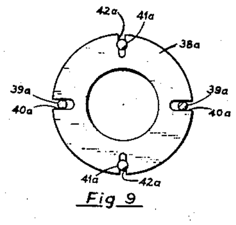
FIG. 9 is a horizontal sectional view taken along line 9—9 of FIG. 8 illustrating the drive disk coupling plate.

The lower drive disk 31*a* for the top record is located entirely by the center hole in the record and by the hole 34*a* in the flywheel shaft 16. The lower drive disk 31*a* also performs the function of driving the upper drive disk 28*b* for the center record through a coupling plate 38*a* which permits slight misalinement between the axes of rotation of the upper drive disks 28*a* and 27*b* respectively, for the top two records. It will be observed in FIGS. 8 and 9 that the lower drive disk 31*a* is provided with a pair of pins 39*a* each of which engages a slot 40*a* in the coupling plate 38*a*. The coupling plate 38*a* is slidably fastened to the stepped cup-washer 35*a* by means of round-headed pins 41*a* passing through a pair of slots 42*a* also provided in the coupling plate. The spring 32*a* is wound and mounted so as to provide a small torque between the lower disk 31*a* of the top record and the upper disk 28*b* of the center record in order to eliminate backlash from the drive system when its direction of rotation is reversed. Spring 32*b* is similarly wound and mounted.

The drive and support of the center and bottom records 30 is accomplished in the same manner as described hereinabove for the top record. The driving force is transmitted from the upper drive disk 28*b* for the center record through the center record to the lower drive disk 31*b* for the center record. Then, in turn, it is transmitted to the stepped cup-washer 35*b* interconnected by the pins 39*b* to the upper drive disk 28*c* for the bottom record and finally to the bottom record which is supported and clamped by the lower drive disk 31*c*. In order to illustrate herein all the positions of the drive mechanism, the drive for the top record has been shown with the record in place, the drive for the middle record has been shown in its open position with the record removed, and the drive for the bottom record has been indicated in the clamped driving position without a record in place. It should be understood that, as will hereinafter appear, the drive and support mechanims for each of the three records are linked together by a lever system so that positions identical to those illustrated in FIG. 8 will never occur. The supporting disks 31*a*, 31*b* and 31*c* are either in the open position or all three disks are in the clamped position, either clamping a record, if one is inserted, or clamped together against a corresponding upper drive disk as illustrated in FIG. 8 for the bottom record position when no record is in place.

The lower drive disk 31*b* for the center record is located by means of the pin 33*b* which pierces the center hole of the record and also by the bore 34*b* of the shaft extension 36*a* of its corresponding upper drive disk. Driving the upper drive disk 28*c* for the bottom record is accomplished by means of the pin 39*b* engaging the second coupling plate 38*b* slidably connected to the stepped cup-washer 35*b* which is carried on a shaft extension 36*b* of the upper drive disk 28*c* for the bottom record. The disk 28*c* is supported in ball bearings 37*b* mounted on the support bar 26*c*. The lower disk of the center record is urged into clamping position by the spring 32*b*, which in FIG. 8 is illustrated in its compressed or open position for insertion of records.

Similarly, the bottom drive disk 31*c* of the bottom record is driven by the corresponding upper drive disk 28*c* and is urged into clamping position by the spring 32*c* reacting against the cup-washer 35*c* supported in ball bearings 37*c* mounted on the bottom plate 1. The lower drive disk 31*c* is similarly located by the bore 34*c* in shaft extension 36*b*.

To remove the lower record drive disks 31*a*, 31*b* and 31*c* to the open position for insertion of records the disks are forced downward against the tension of the springs 32*a*, 32*b* and 32*c*, respectively, by a plurality of release levers more clearly illustrated in FIG. 3 and in FIG. 15. Release levers 43*a* and 43*b* are pivoted on fulcrums 44*a* and 44*b*, respectively, mounted on the support bars 26*b* and 26*c*, whereas release lever 43*c* is pivoted on fulcrum 44*c* mounted on a bottom plate 1. As illustrated in FIG. 6, one end of each release lever is fork-shaped and has a pair of projecting lugs 45 which engage a lip 46 on the corresponding lower record drive disks 31*a*, 31*b* and 31*c* as more clearly appears in FIG. 8. The other end of each lever engages a corresponding groove 47 in a vertical release bar 48. The release bar 48 is arranged to move vertically against the tension of the spring 49 reacting against the middle plate 2. The lower end of the release bar engages a rocker arm 50 pivoted as at 51 from the bottom plate 1. Each end of the rocker arm 49 is provided with a roller 52, one contacting the end of the release bar 48 and the other running on a face cam 53 pivoted coaxially with the flywheel and record axis. The face cam 53 is rotated by the record release lever 10 which extends through the front panel 7. The rocker arm and cam mechanism more clearly appears in FIG. 7 where the release handle 10 is illustrated in the "run" position with records clamped in full lines and is indicated in the record release position in dash lines.

Figure 7:
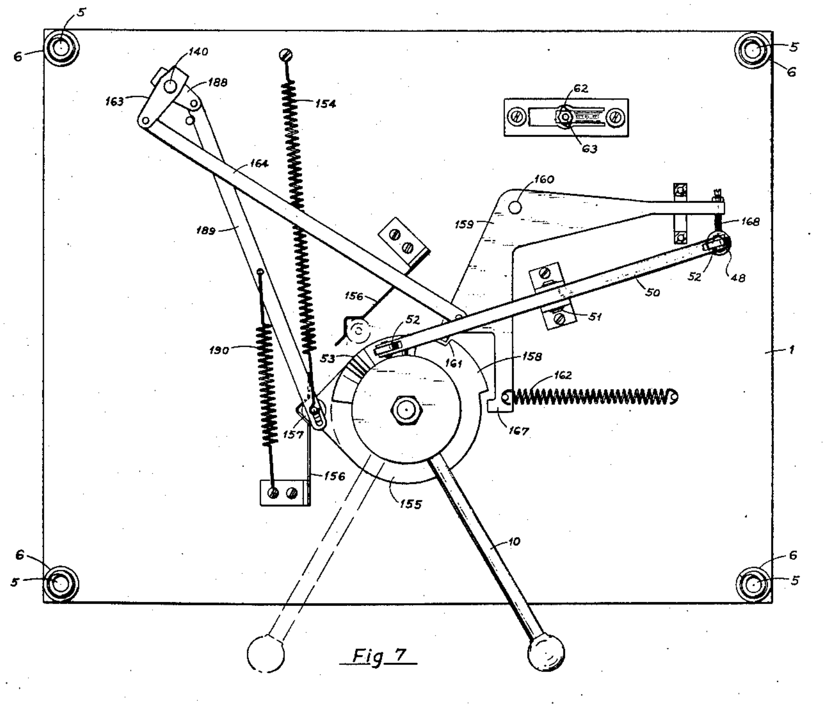
FIG. 7 is a bottom view of the record player-changer illustrating the release lever and a portion of the interlock system.

To insert records 30 to be played the release lever 10 is moved to the position indicated in dash lines in FIG. 7, whereupon the face cam 53 is pivoted and forces one end of the rocker arm 50 downward. The opposite end of the rocker arm 50 moves upwardly and pushes the release bar 48 up against the tension of the spring 49. This movement pivots the release levers 43a, 43b, and 43c and moves the corresponding lower record drive disks 31a, 31b and 31c downwardly, depressing the springs 32a, 32b and 32c, respectively, as illustrated in FIG. 8 for the center record and in FIG. 15 for the bottom record position. In this position the center pins 33a, 33b and 33c, respectively, carried by lower record drive disks move downward so that there is clearance for the insertion of a record through any of the slots 8 in the front panel 7. A record may be inserted through each until it is restrained by the record stop rods 54, illustrated in FIGS. 3 and 6, comprising vertical bars supported between the center and the bottom plates. These stop rods 54 determine the position of the records before they are clamped in playing position. The records are supported on felt covered rails 55, also illustrated in FIG. 6, mounted on each support bar 26b, and 26c and on the bottom plate 1. With the records fully inserted the release lever 10 may be moved to the run position indicated in full lines in FIG. 7, and in so doing, the lower record drive disks move upwardly, the pins in the center thereof engage the corresponding hole in the center of each record and the disks clamp the records firmly in playing position. The record stop rods 54 are located so that as the records 30 are centered on the drive disk center pins 33a, 33b and 33c, respectively, the records move forward slightly and away from the rods 54 to prevent the latter from interfering with the records as they are rotated during the playing sequence. In the record-clamped position the lower record drive disks 31a, 31b and 31c, respectively, completely support the records and lift them off the supporting rails 55 upon which they rest during insertion.

*Record Change Mechanism*

The record change mechanism performs several functions including the vertical travel of the pick-up arm, the radial motion of the pick-up arm, the reversal of rotation of the record drive and various timed tripping functions.

Figure 5:
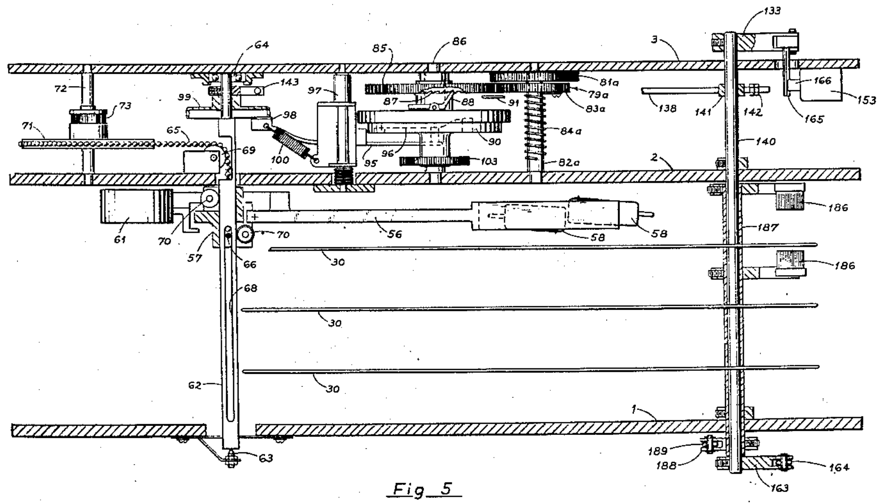
FIG. 5 is a vertical sectional view taken along line 5—5 of FIG. 4 illustrating the record change mechanism and the pick-up arm with its supporting carrier.
Figure 14:
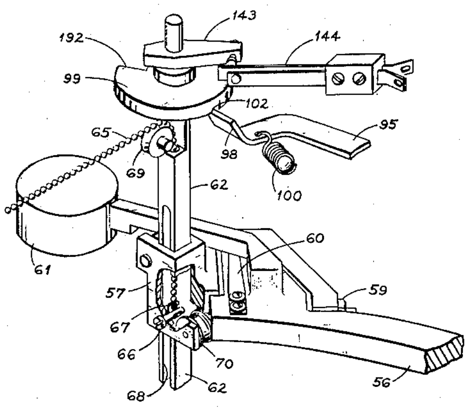
FIG. 14 is a detailed perspective view illustrating a portion of the change mechanism and the pick-up arm carrier.

The pick-up arm details are illustrated in FIGS. 5 and 6 and the perspective view, FIG. 14. The pick-up arm 56 is pivoted on an arm carrier referred to generally as 57 which is arranged to move the pick-up arm vertically and to direct its radial motion. The pick-up arm 56 carries a pair of pick-up cartridges 58, one having its stylus facing downwardly for playing the top surfaces of the records 30, and the other facing upwardly for playing the bottom record surfaces.

The pick-up arm 56 pivots on bearings 59 in either direction from a center position. The pick-up arm is flexibly maintained in this center position by the tension of a pair of leaf springs 60 bearing against the pick-up arm carrier 57. One spring is located on the top of the arm and the other on the bottom providing, in conjunction with the vertical positioning of the pick-up arm carrier 57, the proper playing pressure of each stylus against the records 30 as discussed later in this description.

The pick-up arm 56 is counterbalanced with a counterweight 61 and the weight of the entire arm and counterweight assembly is distributed so as to place the center of gravity of the assembly along the axis about which it pivots on bearings 59. Thus, it is apparent that relatively little tension in either leaf spring 60 is required to return the pick-up arm 56 to its center position.

The entire pick-up arm assembly travels vertically on a square vertical shaft 62 supported from the top and bottom plates and arranged so that it may be rotated to impart radial motion to the pick-up arm 56. The bottom end of the shaft 62 is pivoted on bearing 63 supported from the bottom plate 1, whereas the top end of the shaft 62 is supported in ball bearings 64 mounted on the top plate 3 as is illustrated in FIG. 5. The pick-up arm carrier 57 slides freely along the square shaft 62 and is supported on a ball chain 65 the end of which is pinned to the pick-up arm carrier 57 by a pin 66 which engages the hook 67 carried by the end of the chain, as more clearly appears in FIG. 14. The square shaft 62 is provided with a longitudinal slot 68 through which the pin 66 passes as the pick-up arm carrier travels vertically. The chain 65 passes over a pulley 69 positioned on the center plate 2 so that the chain trains over it and hangs on the centerline of the square shaft 62. Thus, the weight of the pick-up arm assembly is suspended on the shaft centerline and exerts no torque about it. A pair of rollers 70 are provided on the pick-up arm carrier 57 which enable it to roll freely along the shaft 62.

Figure 4:
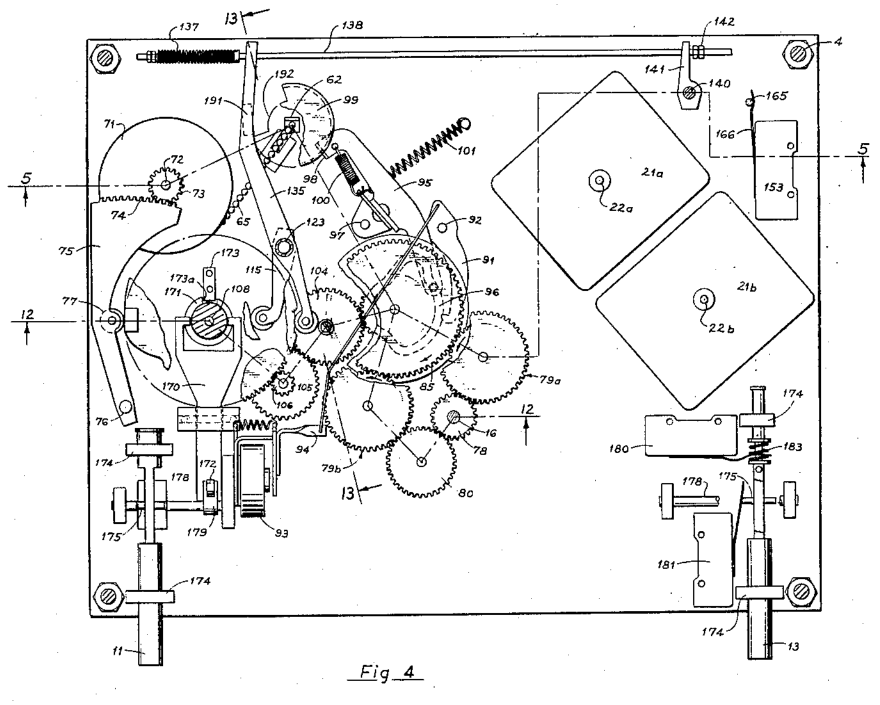
FIG. 4 is a horizontal sectional view taken along line 4—4 of FIG. 3 illustrating the record change mechanism.

The chain 65, which positions the pick-up arm carrier 57 in its vertical travel, winds around the rim of a wheel 71 pivoted on a shaft 72 journaled in the top and center plates 3 and 2, respectively. As indicated in FIGS. 4 and 5 the shaft 72 also carries a pinion gear 73. The pinion 73 engages a gear sector 74 carried along the end of the lever 75 pivoted on the shaft 76 also journaled in the top and center plates as appears in FIG. 10. The lever 75 at about its middle carries a roller 77 which rides on either one of two sequence cams as will be covered later in this description.

The weight of the pick-up arm assembly suspended over the pulley 69 tends to rotate the wheel 71 in a counterclockwise direction. The wheel 71 is restrained from so moving by the smaller pinion 73 engaging the gear sector 74 on the end of the lever 75. The roller 77 is thereby held firmly against the surface of the sequence cam. In operation the cam causes the lever 75 to pivot about the shaft 76 thereby driving the pinion 73 and the wheel 71, and in this manner, raising or lowering the pick-up arm carrier 57 as the case may be.

Figure 12:
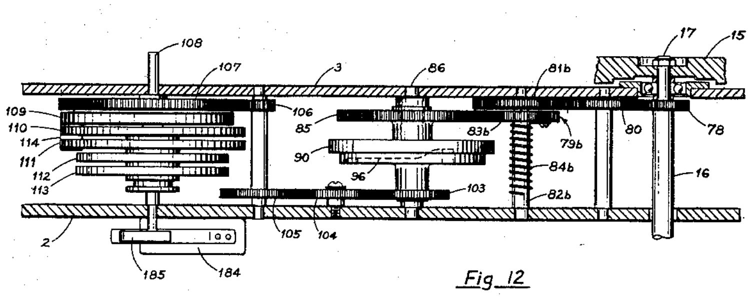
FIG. 12 is a vertical sectional view taken along line 12—12 of FIG. 4 stretched out to illustrate the drive gear train and over-running clutch details.

The change mechanism comprises various elements well-known to those familiar with the record player art cooperating with additional novel elements as hereinafter will be described. The change mechanism is driven in a clockwise direction, regardless of the direction of rotation of the flywheel 15 and the flywheel shaft 16, by means of a pinion gear 78 illustrated in FIG. 12 and a pair of over-running clutches. The pinion 78 carried on the flywheel shaft 16 directly drives one over-running clutch referred to generally as 79a, appearing in plan in FIG. 4 and in elevation in FIG. 5. The pinion 78 drives in the opposite direction a second over-running clutch referred to as 79b, appearing in plan in FIG. 4 and in elevation in the expanded view, FIG. 12, through an idler gear 80. Each over-running clutch comprises a drive gear 81a and 81b, respectively, rigidly affixed to a shaft 82a and 82b, respectively, journaled in the top and center plates. A driven gear 83b and 83b, respectively, fits loosely on each shaft abutting a shoulder. Each shaft also carries a helical spring 84a and 84b, respectively, wound snugly thereon and attached at one end to its respective driven gear 83a or 83b. Both helical springs 84a and 84b are wound in the same direction and when the respective shaft of each is rotated in a counterclockwise direction (when viewed from the top), frictional resistance between shaft and spring causes the spring to tighten about said shaft and to rotate the respective driven gear in a counterclockwise direction also. Conversely, when either shaft 82a or 82b rotates clockwise, the respective springs relax and the driven gears run free. The driven gears, 83*a* and 83*b*, each engage the change gear 85 mounted on another shaft 86 journaled in the top and center plates. Hence, regardless of the direction of rotation of the flywheel shaft 16, one or the other of the driven gears 83*a* or 83*b* always drives the change gear 85 in a clockwise direction as indicated in FIG. 4.

As appears in FIG. 5 the bottom surface of the change gear 85 contains ratchet teeth 87. The ratchet teeth 87 engage an L-shaped latch 88 pivotally mounted as at 89 on the change cam disk 90 which rotates freely on the shaft 86. The center of gravity of the latch 88 is so located with respect to its pivot 89 as to pivot the latch by the force of gravity into engagement with the ratchet teeth 87 of the change gear 85. The latch 88 is disengaged from the ratchet teeth 87 by the trip lever 91 appearing in FIGS. 4 and 5. This trip lever 91 has a hooked end which contacts the upwardly extending leg of the latch 88, pivots it out of engagement with ratchet teeth 87, and holds it in the disengaged position.

When it is desired to reject a particular record or a record has been completed, the record change mechanism is started through its change cycle. This cycle is initiated by releasing the latch 88 and allowing it to fall into engagement with the ratchet teeth 87 of the continuously rotating change gear 85. The latch is released by pivoting the trip lever 91 about its pivot 92 with the electromagnet 93 and interconnecting linkage 94. When the trip lever 91 releases the latch 88, it falls into engagement with the ratchet teeth 87 under the force of gravity, and the change cam 90 rotates with the change gear 85 one revolution until the latch 88 again is disengaged by the trip lever 91. If more than one change cycle is to be made at the particular time, the change cam 90 is allowed to rotate an appropriate number of complete revolutions. The change cam 90 imparts a combination of radial and axial motion to the end of a follower lever 95 which follows a grooved cam surface 96 cut on the under side of the change cam 90. The follower lever 95 is pivoted on a shaft 97 journaled in the top and center plates. The other end of the follower lever 95 has an upwardly extending tip 98 shown more clearly in FIG. 14 which selectively engages an inverted cup 99 mounted rigidly on the square shaft 62 upon which the pick-up arm assembly travels. The follower is held firmly against the cam surface by the bias springs 100 and 101.

During one complete revolution of the change cam 90, the tip 98 of the follower lever 95 initially moves upwardly, engages the cup 99, and by frictional contact therewith pivots it and the square shaft 62 to move the pick-up arm assembly radially outwardly. The follower lever 95 then dwells in this extreme outer position enabling the pick-up arm to move vertically. At the extreme outer position the tip 98 of the follower drops into a notch 102 in the cup 99. After the vertical travel of the pick-up arm is complete, the follower lever 95 pivots inwardly, rotating the shaft 62 to position the pick-up arm over the starting point on the record. The pick-up arm is positioned positively at the same starting point each change cycle by the cooperation of the notch 102 in the cup 99 and the tip 98 of the follower lever 95. The follower lever 95 then disengages from the cup 99 to complete the change cycle.

It will be observed by those familiar with this art that the foregoing change cam, follower lever, and notched cup arrangement is used in current commercial record changers. The present invention utilizes these old components in a new way and in combination with various additional elements heretofore not disclosed in the record player art.

The change cam 90 rotates freely on the shaft 86 and on an extended hub portion carries a spur gear 103 which through the train of gears 104, 105, 106 and 107 drives the sequence cams mounted on a common shaft 108 with the gear 107. The foregoing gear train provides a 7:1 speed reduction so that for each revolution of the change cam 90, the sequence cam shaft 108 rotates one-seventh of one revolution. One complete revolution of the sequence cam shaft 108 corresponds to the playing of all records on all sides or to the rejection of the remaining unplayed sides. For the purposes of this description one such revolution is called a major cycle.

The sequence cam shaft 108 carries five cams, 109, 110, 111, 112 and 113, respectively. The pertinent contours of each cam are illustrated in FIGS. 22, 23, 24, 25, and 26, respectively, with their respective followers shown in the stop position. The latter four will be referred to as the sequence cams, for they are formed on a single hub and are movable as a unit axially along the cam shaft 108 to either of two positions in order to change the record playing sequence. In one position the top and bottom sides of each record are played alternately, starting from the top to the bottom record. In the other position the top sides of all the records are played first and then all the bottom sides.

The roller 77 mounted on the lever 75, described hereinabove, rides on the one or the other of the two upper sequence cams 110 or 111, respectively. It was pointed out above that the weight of the pick-up arm assembly acting through the chain 65 and attendant gearing, forces this roller 77 against the cam surface. In the stop position at the end of a major cycle the roller 77 runs onto a block 114, which is integral with gear 107 fixed to the sequence cam shaft 108, as more clearly appears in FIGS. 3 and 23. In this position the roller 77 does not contact the sequence cams thus permitting them to be moved axially without restraint to change the playing sequence.

Figure 13:
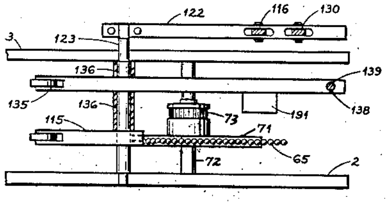
FIG. 13 is a detailed elevational view of a portion of the sequence control mechanism taken along line 13—13 of FIG. 4.

The lower two sequence cams, 112 and 113, determine the direction of rotation of the record drive. The reverse follower 115 runs on either of the lower sequence cams, 112 or 113, depending upon the axial position of the sequence cam assembly. The reverse follower 115 actuates the reverse lever 23 supporting the rubber rimmed idler wheels, 19*a* and 19*b*, through a mechanism that, for the purpose of this disclosure, will be called a spring link. The spring link illustrated in FIG. 2, consists of two coaxial rods, 116 and 117, joined so that the motion of the input rod 116 is communicated to the output rod 117 through a pair of compression springs 118 and 119. When no force is applied to either of the rods, the springs determine a neutral position. Application of either a tension or compression force will lengthen or shorten the length of the link by compressing one or the other of the springs 118 or 119. Rod 117 of the spring link is attached to the reverse lever 23 by means of a slotted clevis 120 pinned to the reverse lever 23 with the pin 121. The rod 116 of the spring link is pinned to a lever 122 rigidly fixed to the shaft 123 upon which the reverse follower 115 pivots, as shown in FIG. 13. Thus, either cam 112 or 113 pivots the follower 115 and imparts a corresponding motion to the lever 122 to shorten or lengthen the spring link.

The reverse lever 23 is also actuated by an over-center compression spring 124 which causes the reverse lever 23 to complete its motion after the output rod 117 of the spring link moves the lever past its center position when reversing the rotation of the record drive. In the driving position the over-center spring 124 gently forces the proper idler wheel, 19*a* or 19*b*, against its corresponding motor spindle, 22*a* or 22*b*, and the flywheel 15. In this driving position the reverse lever 23 is in no way restrained by the output rod 117 of the spring link because of the clearance provided in the slotted clevis 120.

When a change in direction of rotation for the record drive occurs, the reverse lever 23 is moved under the influence of springs, since the motor drive is necessarily disconnected from the flywheel at this particular time. In making such change the initial motion of the reverse lever 23 is caused by action of the spring link and its final motion results from action of the over-center spring 124. It will be observed in FIG. 2 that the over-center spring 124 bears against a pivoted seat 125 mounted on the reverse lever 23, and it also bears against the fixed seat 126 mounted on the top plate 3 in such a location that when the reverse lever is in its dead-center position (with neither idler wheel engaged) the over-center spring 124 exerts a force upon the reverse lever 23 passing through its pivot 24. But when the reverse lever 23 is either to one side or the other of this dead-center position, the line of force exerted by the over-center spring 124 lies to one side of the pivot 24 and develops a turning torque about said pivot. For example, if the reverse lever has been moved past its center position in a clockwise direction, torque developed by the over-center spring rotates the reverse lever farther in the clockwise direction.

The output rod 117 of the spring link is restrained in its axial movement by a pair of latches 127*a* and 127*b* pivoted on pins 128*a* and 128*b*, respectively, mounted on the top plate 3. The latches are pivoted into engagement with shoulders on the output rod 117 by means of the spring 129 seated against an arm of each latch. The latches are tripped by a reciprocable actuator rod 130 carrying trip dogs 131*a* and 131*b*. The actuator rod 130 also is pinned to lever 122 and is similarly operated by the reverse follower 115 and sequence cams.

Thus, proper movement of the reverse follower 115 induced by one of the two lower sequence cams, 112 or 113, moves the actuator rod 130 to trip one or the other of the latches 127*a* or 127*b*. When this occurs the spring link suddenly shortens or lengthens, as the case may be, moving the reverse lever 23 to a point slightly past its center position whereupon the over-center spring 124 completes the motion and brings the proper idler wheel into engagement with its motor spindle and the flywheel 15. The reverse follower 115 is spring-biased against the sequence cams by the spring 132 attached to lever 122. The spring normally compresses the spring link to its neutral position—that is, with the springs 118 and 119 about equally compressed.

At the completion of a major change cycle the reverse lever 23 is restrained by the stop latch 133. The stop latch 133 engages a projection on the reverse lever 23 after the latter completes its last reversal and is about at its center position with both idler wheels disengaged. The stop latch 133 holds it in the disengaged position so that depressions in the rubber rims cannot develop if the changer remains idle for any length of time. The actuation of this stop latch 133 is covered in a following portion of this description.

At the end of each change to clockwise rotation of the record drive (the direction for playing the top side of a record) the lever 122 strikes an adjustable abutment 134 which prevents the bias spring 132 from forcing the reverse follower 115 any further toward the cam axis. At the end of a major cycle the cam shaft 108 continues to rotate a small amount after the reverse lever 23 disconnects the motor drive due to the coasting of the flywheel 15, and, since the reverse follower 115 then rests against the abutment 134, the pressure between the follower 115 and either of the cams 112 or 113 is relieved. This permits the sequence cams to be moved axially as desired for changing the playing sequence.

The fifth cam 109 functions to stop the major change cycle and the cam is not axially shiftable with the other sequence cams, as this function need not be altered when the playing sequence is changed. A follower 135 rides on the surface of cam 109 and performs two functions; namely, it enables the stop latch 133 to engage the reverse lever 23 at the end of a major cycle, preventing it from doing so during the cycle, and it restrains the radial motion of the pick-up arm during the seventh revolution of the change cam 90 as hereinafter described. The follower 135 pivots on shaft 123 and is located vertically by sleeves 136. The follower has an extended lever end which engages one end of the spring 137 fixed at the other end to the rod 138 which passes through an aperture 139, appearing in FIG. 13, in the extremity of said lever end. This spring 137 holds the follower firmly against the cam 109 which imparts a reciprocable motion to the rod 138.

It will be observed in FIGS. 2 and 5 that the stop latch 133 is hinged at about its midpoint with one extremity affixed to a vertial shaft 140 extending through and journaled in plates 1, 2 and 3, as illustrated in FIG. 5. The latch shaft 140 carries a crank 141 having a hole in its outer extremity through which the rod 138 also passes. The rod 138 is provided with a dog 142 for engaging the crank 141.

Figure 22:
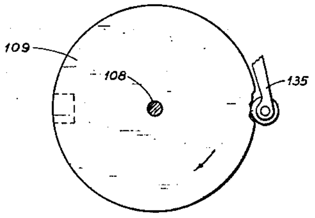
FIGS. 22, 23, 24, 25 and 26 are plan views of the various cams mounted on the sequence cam shaft illustrating their surface configurations.
Figures 23, 24:
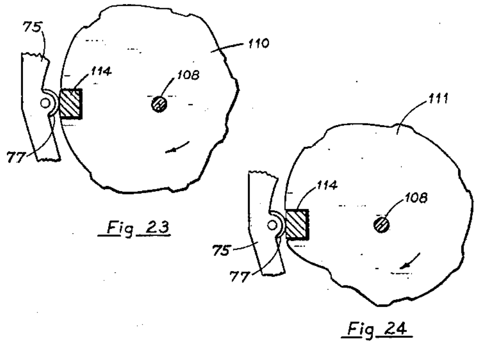
Figure 25:
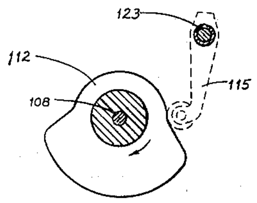

As hereinafter disclosed, the stop latch 133 is actuated to start the record player by pivoting the shaft 140 with a counterclockwise displacement from the stop position indicated in FIG. 4. Then as the sequence cams rotate, the follower 135 also is pivoted in a counterclockwise direction by the cam 109, the pertinent contour of which is illustrated in FIG. 22. The dog 142 on the rod 138 engages the crank 141 on the stop latch shaft 140 and prevents the latter from moving back to the stop position, illustrated in FIG. 4, until the cam 109 has almost completed one revolution (a major cycle). Whereupon the depression in the cam 109 and the spring 137 cooperate to pivot follower 135 in the clockwise direction moving rod 138 to the right. The dog 142 carried thereon disengages from the crank 141 and the stop latch shaft 140 is free to pivot back into its stop position.

A major change cycle is initiated or continued through subsequent positions by energizing the electromagnet 93, which through the linkage 94, the trip lever 91, and the latch 88, causes the change cam 90 to complete one revolution each time it operates. The electromagnet 93 is energized by one of three means; namely, the lever 143 rigidly mounted on the square shaft 62 trips an electrical contactor 144, more clearly appearing in FIG. 14, when the pick-up arm 56 reaches its innermost position, completing an electrical circuit to the electromagnet 93; or, actuation of one of the reject buttons, 13 or 14, completes the same electrical circuit; or another contactor carried on the pick-up arm 56 completes the same circuit when the pick-up arm attempts to play in a position in which no record has been inserted.

Figure 17:
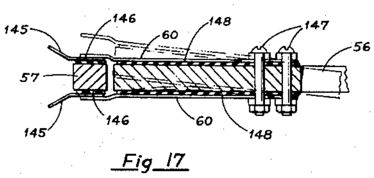
FIG. 17 is a sectional view of the end of the pick-up arm taken along line 17—17 of FIG. 6 illustrating the pick-up arm leaf spring arrangement.

In the latter case the leaf springs 60 on the pick-up arm 56 act as an electrical contactor that senses the vertical position of the pick-up arm. In FIG. 17 the relationship between the pick-up arm 56 and the pick-up arm carrier 57 with no record in place is illustrated in full lines, and their relationship when playing a bottom record side is indicated in dash lines. The pick-up arm carrier 57 is provided with a pair of electrical contacts 145 insulated therefrom by strips of insulating material 146. The leaf springs 60, electrically interconnected by bolts 147 and insulated from the pick-up arm by similar insulating strips 148, constitute a contactor which completes or breaks an electrical circuit between the two contacts 145.

If the stylus carried in either pick-up cartridge 58 contacts a record, the pick-up arm 56 is deflected from the horizontal, as is illustrated in FIG. 17 for the position assumed in playing the bottom face of a record. One of the leaf springs 60 is moved away from its corresponding contact 145 and the electrical circuit between both contacts 145 is opened. Whereas if no record is in place, the pick-up arm 56 remains in a horizontal position and the leaf springs 60 complete the electrical circuit between contacts 145 and the electromagnet 93.

Figure 10:
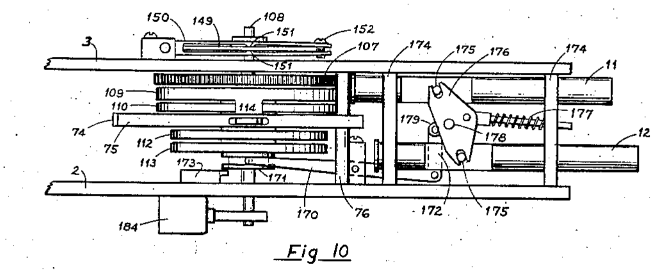
FIG. 10 is a side elevational view of the sequence control buttons and the sequence cams, looking toward the left side of FIG. 2.

One further structural feature of the change mechanism is the braking means provided on the sequence cam shaft 108 to prevent the latter from over-running. This brake, illustrated in FIGS. 2 and 10, is comprised of a circular disk 149, affixed at the upper extremity of the sequence cam shaft 108 and a resilient brake member 150 mounted on the top plate 3. The brake member is fork-shaped and has a pair of frictional surfaces 151 which contact and brake the circular disk 149. The frictional resistance of the brake member 150 is controlled by the adjusting screw 152 which varies the normal force with which the frictional surfaces contact the disk 149.

*Interlocking and Other Features*

The unit is started by moving the release lever 10 to the start position, slightly to the right of the run position indicated in FIG. 7. This movement actuates a start switch 153, FIGS. 5 and 21, supplying current to the drive motors, 21*a* and 21*b*. The release lever 10, as disclosed hereinabove, is secured to the face cam 53 and also functions to release or clamp the various records 30 in playing position.

The release lever 10 is biased against movement from the record release position, illustrated with dash lines in FIG. 7, by spring 154 secured at one end to the bottom plate 1 and at the other to the plate 155, an integral part of the face cam 53. A pair of spring catches 156 engage the roller 157 pivoted on the plate 155 and appropriately position the release lever assembly in the run position (i.e., the position during a major cycle) or in the record release position where all records are unclamped. Movement of the release lever 10 to the right of the run position, as viewed in FIG. 7, is required to start the unit as will be apparent from the following description.

The plate 155 carries a protruding lug 158 operatively engaging the divergent fingers of a bell crank 159 pivoted as at 160 from the bottom plate 1. One finger of the bell crank 159 is biased against the forward edge 161 of the lug 158 by another spring 162 secured at one extremity to the bottom plate and at the other, to the bell crank 159. It will be observed in FIG. 7 that by pivoting the release lever 10, the lug 158 pivots both the bell crank 159 and the vertical stop latch shaft 140 through a linkage interconnecting the two, composed of a crank 163 secured to the latch shaft 140 and an interconnecting link 164. This movement of the latch shaft 140 pivots the stop latch 133 out of engagement with the projecting portion of the reverse lever 23, enabling the lever to pivot as previously described. Simultaneously, the depending pin 165 carried by the stop latch 133 moves away from the operating finger 166 of the start switch 153 which closes and supplies power to the drive motors.

After the stop latch 133 has been unlatched in the foregoing manner and the unit started, the crank 141 secured to the latch shaft 140 with its cooperating actuator rod 138 controlled by the fifth cam 109 withdraws the latch and holds it withdrawn until just before the end of a major cycle, as previously described. Thus, the switch 153 cannot be opened by the stop latch 133 until just before the end of a major cycle.

In addition the crank 163 and link 164 at the lower end of the latch shaft 140 lock the bell crank 159 and hence the release lever 10 in the run position until just before the end of a major cycle. A hook 167 on the bell crank 159 engages the lug 158 and prevents rotation of the release lever 10 toward the release position illustrated in dash lines in FIG. 7. Therefore, once the unit is started, the records cannot be released from the clamping action of the record drive disks until the changer has completed a major cycle. Then, just before the end of a major cycle, the fifth cam 109 through its follower 135 moves the rod 138 to the right releasing the crank 141 and permitting the latch shaft 140 to be pivoted. This is accomplished by the bias spring 162 secured to the bell crank 159 which urges the crank toward the record release position and through the interconnecting linkage pivots the stop latch shaft 140 and the stop latch 133 toward its latching position. It will be observed in FIG. 7 that there is sufficient clearance between the fingers of the bell crank 159 and the lug 158 in its run position to permit the foregoing movement of the bell crank. As the major cycle is completed the spring link moves the reverse lever 23 slightly past its dead-center position, the projection on the release lever engages the stop latch 133, and the spring link forces the stop latch 133 and its depending pin 164 against the operating finger 166 of the start switch 153, opening the switch and shutting off the power supply to the unit. The switch 153 is held in this open position by the over-center spring 124 acting through the release lever 23 and the stop latch 133.

Figure 16:
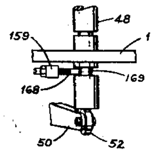
FIG. 16 is a detailed perspective view illustrating the interlock on the lower end of the release bar.

Another interlock is provided to prevent the unit from being started if one or more of the records 30 have not been properly inserted so that the corresponding pins 33*a*, 33*b*, or 33*c* carried by the lower drive disks cannot enter the center holes in the records. This prevents one or more of the corresponding release levers 43*a*, 43*b*, or 43*c* from completing its motion with the result that the release bar 48 cannot complete its full downward movement. Movement of the bell crank 159 to the start position is possible only when a projecting pin 168 at one end enters a groove 169 in the release bar 48 as more clearly appears in FIG. 16. Thus, if the release bar 48 fails to complete its maximum downward motion when the records are clamped, the bell crank 159 cannot move to pivot the stop latch 133 and the unit cannot be started.

A further interlock is provided to prevent changing of the playing sequence during a major cycle. As will be observed in FIGS. 4 and 10, the sequence cams 110, 111, 112 and 113 as a unit are moved axially along the sequence cam shaft 108 by means of a forked lever 170, which engages a flanged ring 171 formed as a part of the slidable sequence cam hub. The forked lever 170 is carried on a pivot mounted on the center plate 2 and is pivoted by the sequence push buttons 11 and 12 through a linkage, referred to generally as 172, connected to one end. The slidable sequence cams are locked in position during a major cycle by means of a fixed finger 173 mounted on the center plate 2 which engages a flange of the ring 171. During a major cycle the flange must remain on one side or the other of the finger 173 and hence axial movement of the sequence cams is prevented. At the end of a major cycle a slot in the flange of ring 171 moves into position with the fixed finger 173, as appears in FIG. 4, permitting the flange to be moved past the finger 173, as desired, to change the playing sequence.

Figure 11:
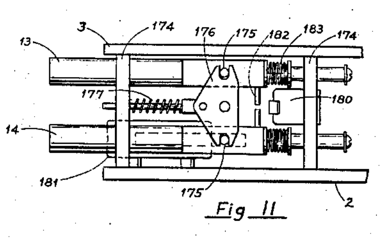
FIG. 11 is a side elevational view of the reject control buttons looking toward the right side of FIG. 2.

Both sequence push buttons, 11 and 12, and the reject push buttons 13 and 14, are the same type comprising a push button 11, 12, 13 or 14, respectively, slidably supported in brackets 174 secured between the center plate 2 and the top plate 3. As more clearly appears in FIGS. 10 and 11, each pair of push buttons 11 and 12 or 13 and 14, respectively, carry pins 175 slidably fitting into slots at either end of a pivoted connecting plate 176. Each connecting plate 176 is provided with an over-center spring and shaft arrangement 177 pinned at one end to the connecting plate 176 and secured at the other to one of the support brackets 174. When either one of the push buttons is depressed, as is button 11 in FIG. 10, the over-center spring 177 exerts a torque about the pivot axis 178 of the connecting plate 176 and insures that the button moves through the entire length of its stroke. In the case of the sequence control buttons 11 and 12, the shaft 178 upon which the connecting plate 176 pivots has an extended end carrying a crank 179 which is interconnected to the linkage 172, referred to hereinabove, for moving the sequence cams.

The reject push buttons 13 and 14, respectively, operate a pair of limit switches 180 and 181 appearing in plan in FIG. 4. Depressing the normal reject button 13 momentarily closes the limit switch 180 by moving the pin 182 carried thereon into engagement with the operating finger of the aforesaid switch. A spring 183 disengages the pin after momentary contact has been made and pressure on the push button ceases. This energizes the electromagnet 93 and rejects the particular record being played at the time. Similarly, depressing the reject-all push button 14 causes one of the pins 175 carried thereon to close the limit switch 181 to reject all remaining records in the unit.

The electrical circuitry is illustrated in the diagram

Figure 21:
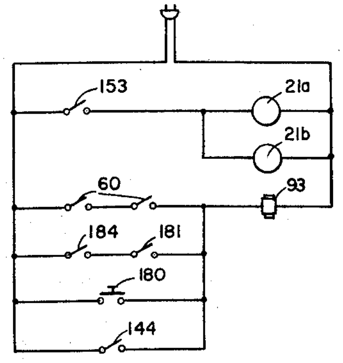
FIG. 21 is an electrical circuit diagram for the present invention.

FIG. 21 showing a power source connected across both motors 21*a* and 21*b* in parallel both wired in series with the start switch 153. The electromagnet 93 is also connected across full line voltage and in series with a plurality of switches; namely, the end of record trip switch 144, the normal reject switch 180, the leaf spring contactor 60 on the pick-up arm, and the reject-all switch 181 connected in series with a second switch 184, appearing in FIG. 10, operated by the sequence cam shaft 108. From the diagram, FIG. 21, it will be apparent that the electromagnet 93, which starts the change cam 90 through its cycle, may be energized in a number of ways. Firstly, after a record has been performed and the pick-up arm 56 moves to its innermost point, the end of record trip switch 144 on the square pick-up arm shaft 62 is actuated, starting the change cam 90 through its cycle. Secondly, the normal reject button 13 may be depressed, again energizing the electromagnet 93 and moving the pick-up arm off the particular record and through its change cycle. Thirdly, if a record is not in place in a particular playing position, the leaf spring contactor 60 on the pick-up arm closes the circuit to the electromagnet 93 causing the change mechanism to continue through the change cycle. Fourthly, by depressing the reject-all button 14 the switch 181 is closed and subsequently the switch 184 is closed after the first record side has been played and remains closed until all sides of all records have been rejected and a major cycle completed. The cam shaft 108 actuates the switch 184 by means of a cam 185 shaped to close the switch after the first side of the top record has been played. With the foregoing switches, 181 and 184, the unit may be used to play single records on one side only.

One further feature of the present invention is a pair of brushes 186 secured to a sleeve 187 fitting over the stop latch shaft 140, FIG. 5. These brushes are arranged to clean the pick-up head styli by brushing over them to remove dust and grit. The brushes 186 are moved and the movement thereof controlled by the crank 188 secured to the sleeve 187. The crank is operated by the release lever 10 through an interconnecting link 189. The brushes 186 are moved across the styli as the release lever 10 is moved from the run position illustrated in FIG. 7 to its release position illustrated in FIG. 7 in dotted lines, and the brushes are returned by spring 190.

*Operation*

One or more records 30 are inserted each through a respective slot 8 in the front panel 7 of the unit so that the innermost edge of each contacts the record stop rods 54 and the record is supported upon the felt-covered rails 55. The desired playing sequence is selected and either pushbutton 11 or 12 repressed. For the purposes of this description it will be assumed that push-button 11 is depressed and the playing sequence is alternately the top side of the top record, then the bottom side of the top record, the stop side of the second record, etc. As pointed out in a prior part of this description the release lever 10 may be moved to the run position and to the start position only if all records are properly in place. This enables the pins 33*a*, 33*b* and 33*c*, respectively, to pierce the center hole in each record and the records are firmly clamped between the respective record drive disks 28*a* and 31*a*, 28*b* and 31*b*, or 28*c* and 31*c* as the release lever 10 is moved to the run position. The pin 168 on the bell crank 159 moves into the groove 169 in the release bar 48.

As the release lever 10 is moved farther to the start position, the bell crank 159 and link 164 connected to the latch shaft 140 pivots the latch shaft moving the stop latch 133 out of engagement with the projection on the reverse lever 23 and closing the start switch 153. This energizes the drive motors 21*a* and 21*b*. The over-center spring 124 pivots the reverse lever and moves the idler wheel 19*b* into engagement with the flywheel 15 and its motor spindle 22*b*. This initiates the rotation of the drive mechanism and records in a clockwise direction. The latch 127*b* is urged into engagement with its corresponding shoulder on the spring link rod 117 so that rod is restrained from movement and the sequence cam shaft 108 rotates to complete the change cycle interrupted when the unit was previously stopped. The change cam 90 completes the remainder of its cycle; that is, the sequence cams 111 or 112 pivot lever arm 75 outwardly moving the pick-up arm assembly up to its uppermost position. Then the tip 98 of the follower lever 95 having previously engaged the notch 102 in the inverted cup 99 pivots the cup 99 and moves the pick-up arm 56 inwardly over the top face of the top record to its start position. Thereupon the sequence cam 111 allows the lever arm 75 to move inwardly under the influence of the weight of the pick-up arm assembly so as to deflect the end of the pick-up arm upwardly against the tension of the upper leaf spring 60 to provide the proper playing pressure of the stylus against the record 30. The top face of the top record is performed.

Upon completion of the top face of the record the stylus strikes the eccentric circle at the inner part of the record grooving and the lever 143 carried on the square shaft 62 closes the end of record trip switch 144. This closes the circuit to the electromagnet 93 which trips the change cam latch 88 allowing it to engage the ratchet teeth 87 of the change gear 85 and the change cam 90 proceeds through a change cycle. First the sequence cam 111 moves the lever 75 so as to raise the pick-up arm carrier slightly. The tip 98 of the cam follower 95 then engages the inverted cup 99, pivots the pick-up arm 56 outwardly over the top face of the top record until it clears the record. The pick-up arm dwells in this position as the sequence cam 111 again permits the weight of the pick-up arm assembly to move the pick-up arm downwardly to a vertical position about half way between the top and center records.

During the foregoing pick-up arm travel the reverse cam 113 pivots the follower 115 and moves the lever 122 in a counterclockwise direction. This compresses the spring 119 while spring 118 elongates. Then upon completion of the downward pick-up arm travel the latch dog 131*b* on the spring link actuating rod 130 trips the latch 127*b* enabling the spring link to shorten suddenly, pivoting the reverse lever 23 about its pivot 24 and moving the idler wheel 19*a* into engagement with the flywheel and its respective motor spindle 22*a*. This reverses the rotation of the flywheel and record drive so that the records rotate in the proper direction for playing the bottom side of the top record.

The tip 98 of the follower lever 95 having engaged the notch 102 in the inverted cup 99 pivots the pick-up arm inwardly to the start position. Then, the sequence cam 111 actuates lever 75 to move the pick-up arm carrier upwardly slightly so that the stylus 58 contacts the record and depresses the pick-up arm slightly against the tension of the lower leaf spring 60 to attain the proper playing pressure.

The underside of the top record is performed and when the pick-up arm reaches its innermost position the end of record trip switch 144 again is closed energizing the electromagnet 93 and initiating another change cycle. The pick-up arm carrier is moved downward slightly to disengage the stylus from the record, the pick-up arm is moved radially outwardly by the follower 95, and it then dwells in the extreme outward position.

During this change cycle the spring link has been shortened as the lever 122 is moved clockwise, compressing spring 118 and elongating spring 119 with the latch 127*a* having fallen into engagement with its corresponding shoulder on rod 117 at the time the previous reversal was made. As the pick-up arm dwells the dog 131*a* trips latch 127*a*, the spring link lengthens suddenly and pivots the reverse lever 23 moving the idler wheel 19*b* into engagement with the flywheel and its respective motor spindle. Thus, the flywheel and record drive are again rotated in the clockwise direction. The sequence cam 111 allows the pick-up arm carrier to move downward slightly and then the end of the follower 95, having engaged the notch 102 in the inverted cup 99, pivots the pick-up arm inwardly to the start position. The pick-up carrier moves downwardly slightly again while the stylus contacts the top face of the center record and depresses the pick-up arm against the tension of the upper leaf spring 60 to attain proper playing pressure. The top face of the center record is performed.

The operation of the mechanism continues in the same manner for subsequent record sides until the underside of the last record has been completed. At this time the end of record trip 144 is closed and the pick-up arm moves off the record and outwardly to its extreme outer position. There it dwells as the pick-up arm carrier moves upward to its initial start position. During this motion the follower 135 actuates the rod 138 permitting the latch shaft 140 to pivot whereupon the bias spring 162 moves the stop latch 133 into the latched position. It will be observed in FIG. 7 that there is sufficient clearance between the lug 158 and the divergent fingers of the bell crank 159 to permit this slight movement. As the pick-up arm moves upward to the position for playing the top record, the spring link is shortened; that is, spring 118 is compressed and spring 119 elongated with the rod 117 held in position by the latch **127*a*. When the pick-up arm attains its top position the dog 131*a* trips latch 127*a*, the spring link suddenly pivots the reverse lever 23 slightly past its dead-center position where the projection carried on its end engages the stop latch 133 driving it against the finger 166 of the start switch 153**, and the unit stopped.

Although the embodiment of the present invention disclosed herein accommodates three records or six record sides, it is preferred to provide seven complete revolutions of the change cam 90 in a major cycle. This allows the pick-up arm carrier time to travel from its lowermost position to the top start position at the end of the sequence just described. Hence, the sequence cam shaft 103 and the change cam 90 are geared in a 7:1 ratio as previously mentioned. During the seventh revolution of the change cam the pick-up arm is restrained from pivoting fully to the position for starting a record by a depending stop bar 191 carried on the lever end of follower 135. This stop bar 191 cooperates with an indentation 192 in the inverted cup 99 during the seventh change cam revolution to hold the pick-up arm and prevent interference between the pick-up arm and the records as the former moves past.

At any time one of the reject buttons may be pushed to reject a single record or to reject all the remaining records. If only a single record is to be rejected the push button 13 is depressed which, as pointed out in a prior part of this description, closes switch 180 and energizes the electromagnet 93 so that the change cam moves through a single revolution. Alternatively, the push button 14 may be depressed. This closes switch 181 and after the first record side is played the cam 185 closes switch 184 energizing the electromagnet 93 and causing the sequence cam to repeatedly move through change cycles until all record sides have been rejected and the unit stopped.

The various motions of the change mechanism and other parts of the unit are similar for the sequence established by depressing the push button 12 for playing the top side of all records and then the bottom side of all records.

*Modifications*

Figure 19:
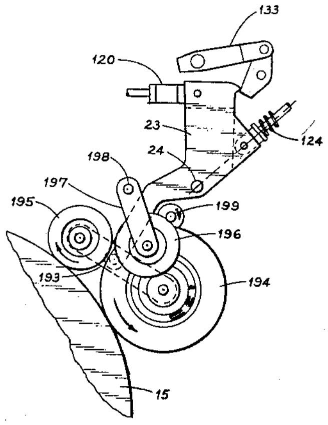
FIG. 19 illustrates a modified record drive reversing mechanism utilizing only a single drive motor.

Various modifications of the mechanical elements of this invention may be apparent to those familiar with the record player art. For example, a modified flywheel drive mechanism is illustrated in FIG. 19, wherein the reverse lever 23 carries a modified reverse bar 193 pivoted from its end. One end of this bar carries a large diameter rubber rimmed wheel 194 and the other end carries a similar wheel of smaller diameter 195. An idler wheel 196 is rotatably mounted on an arm 197 pivoted from the top plate as at 198 to engage in rolling contact both the smaller rubber rimmed wheel 195 and the spindle 199 of a single unidirectional motor. Movement of the reverse lever 23 in one direction brings the large diameter wheel 194 into rolling contact with both the motor spindle 199 and the flywheel 15 driving the latter in a clockwise direction, whereas movement of the reverse lever 23 in the other direction brings the smaller wheel 195 into rolling contact with the flywheel 15 and the idler wheel 196 which in turn contacts the motor spindle 199. Therefore, with the foregoing mechanism the flywheel may be driven in either direction by a single unidirectional drive motor.

Figure 20:
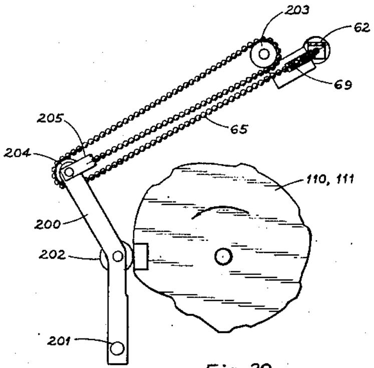
FIG. 20 shows a modified mechanism for raising and lowering the pick-up arm carrier.

FIG. 20 illustrates a modified mechanism for imparting vertical movement to the pick-up arm carrier. The sequence cams 110 or 111 engage a modified follower 200 pivoted at 201 from the center plate having a roller 202 which rides on the cam surface. A pulley system replaces the gear sector and pinion described hereinabove for imparting vertical movement to the chain 65 supporting the pick-up arm carrier. This pulley arrangement comprises a fixed pulley 203 rotatably mounted on the center plate and traveling pulley 204 mounted on the end of the follower 200. The end of the chain is fixed to the follower 200 as at 205. Thus, it will be observed that a small movement of the cam follower 200 induces a considerably greater movement of the chain 65 as a function of the number of parts in the pulley system. As illustrated herein a 3:1 movement ratio is produced.

Figure 18:
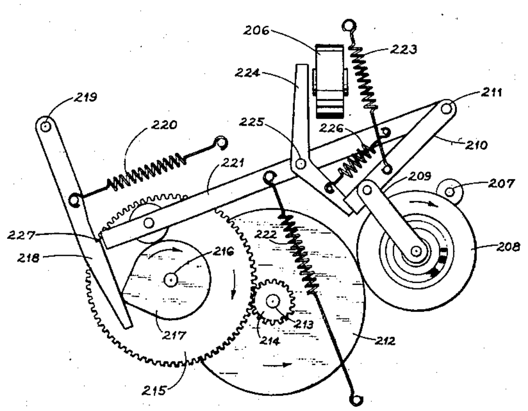
FIG. 18 illustrates a modified change mechanism drive eliminating the over-running clutches.

Another possible modification is illustrated in FIG. 18 showing a modified drive for the change mechanism. The mechanism illustrated provides a single revolution of the change cam by selectively actuating the electromagnet 206. A single motor spindle 207 drives a rubber rimmed idler wheel 208 pivotally mounted on the arm 209, in turn pivoted on the lever 210. The lever 210 is pivoted on a fixed pivot 211 secured to the center plate. The idler wheel 208 drives by rolling contact a larger diameter wheel 212 pivoted from the center and top plates on shaft 213. The shaft 213 also carries a small pinion gear 214 which engages gear 215 carried on the same shaft 216 as the change cam. Shaft 216 also carries cam 217 which engages the latch lever 218 pivoted from the middle plate as at 219 and held firmly against the cam by spring 220. A lever follower 221 is also urged against the cam 217 by another spring 222. The lever follower 221 has a pivot 211 in common with the lever 210.

The idler wheel 208 is urged into contact with both the motor spindle 207 and the larger wheel 212 by the spring 223. By actuating the electromagnet 206 a second latch lever 224 is pivoted about its pivot 225 on the lever 221 against the tension of the spring 226. This unlatches the lever 210 enabling the spring 223 to pull the idler wheel 208 into engagement with the motor spindle 207 and the large diameter wheel 212. The motor spindle thereupon drives the larger diameter wheel 212 through the idler wheel 208 as well as the pinion 214 mounted on the same shaft. The pinion 214 rotates the gear 215, the cam 217, and the change cam, all carried on the change cam shaft 216. Initial rotation of the cam 217 from its position indicated in FIG. 18 allows the latch lever 218, biased by spring 220, to pivot counterclockwise into position for latching follower lever 221. Further rotation of the cam 217 pivots follower lever 221 clockwise, latch lever 218 is biased into engagement therewith and the latch shoulder 227 carried on latch lever 218 restrains follower 221 from returning to the position assumed in FIG. 18 until cam 217 approaches the end of one complete revolution. As such time cam 217 pivots latch lever into the position shown in FIG. 18 and follower 221 suddenly slips out of engagement with the shoulder 227 and returns to its original position as shown. This movement of follower 221 suddenly disengages the drive mechanism from the motor spindle 207 at the end of a single revolution of the change cam.

The lever 221 carries with it the latch lever 224, which upon the de-energizing of the electromagnet 206 has assumed its latched position under the influence of spring 226, and, as lever 221 is suddenly urged by spring 222 to its original position, the latch lever 224 engages the lever 210, moving the idler wheel 208 out of contact with the motor spindle 207 and large diameter wheel 212. The advantage of this modified drive arrangement over the dual over-running clutches, described hereinabove, is that there is no movement of the mechanism with its attendant noise factor except during the change motion, whereas in the over-running clutch drive, the clutches and the gearing rotate continuously and unavoidably produce some undesirable gear noise.

Various other modifications will become apparent to those skilled in this art without departing from the scope of the invention. The modifications just described are set forth by way of illustration and not by way of limitation. Therefore, the present invention is not to be limited by the foregoing description but is defined by the following claims.

I claim:

1. An automatic phonograph record player and changer comprising a supporting frame; a record support and drive means for simultaneously rotating a plurality of fixedly spaced records in either of two directions about a common vertical axis; means individually spring biased for securing said records in a directly coupled fixedly spaced series on said record support and drive means; a vertically reciprocable pick-up arm assembly including a pick-up arm for selectively reproducing the sides of said records; sequence control means for controlling the vertical travel of said pick-up arm and for controlling the direction of rotation of said record support and drive means in relation to the vertical travel of said pick-up arm, said sequence control means defining at least one preselected playing sequence for any of the several sides of said records; positioning means for intermittently moving said pick-up arm radially with respect to the axis of rotation of said records; and means for actuating said positioning means and said sequence control means in timed relationship to one another.

2. An automatic phonograph record player and changer comprising a supporting frame; a record support and drive means for simultaneously rotating a plurality of fixed spaced records in either of two directions about a common vertical axis of rotation including reversible motor drive means, a plurality of record drive disks arranged in pairs, said pairs being directly coupled in a series rotated in tandem in a directly coupled fixedly spaced series by said motor drive means about said vertical axis, a pair of said drive disks being provided for each of said records, separate spring means for urging at least one of said drive disks of each of said pairs into operative engagement with the other disk of said pair, and bearing means supporting said support and drive means from said supporting frame; lever means for retracting at least one of the drive disks of each of said pairs against said spring means to permit insertion of a record between said disks; a pick-up arm mechanism including a vertical rod pivoted from said frame about a vertical axis, said rod being mounted a spaced distance from said axis of rotation of said records, a vertically reciprocable carrier means travelling on said rod, and pivotable therewith, and a pick-up arm pivoted from said carrier means about a horizontal axis and carrying a pair of pick-up cartridges, one operatively disposed upwardly and the other operatively disposed downwardly; sequence control means for controlling the travel of said carrier means and for controlling the direction of rotation of said support and drive means in relation to the vertical travel of said pick-up arm, said sequence control means defining at least one preselected playing sequence for any of the several sides of said records; positioning means for intermittently pivoting said vertical rod to move said pick-up arm radially with respect to the axis of rotation of said records; and means for actuating said positioning means and said sequence control means in timed relationship to one another.

3. An automatic phonograph record player and changer comprising a supporting frame; a record support and drive means for simultaneously rotating a plurality of fixedly spaced records in either of two directions about a common vertical axis of rotation including reversible motor drive means, a plurality of record drive disks arranged in pairs, said pairs being directly coupled in a series rotated in tandem in a directly coupled fixedly spaced series by said motor drive means about said vertical axis, a pair of said drive disks being provided for each of said records, separate spring means for urging at least one of said drive disks of each of said pairs into operative engagement with the other disk of said pair, and bearing means supporting said support and drive means from said support frame; lever means for retracting at least one of the drive disks of each of said pairs against said spring means to permit insertion of a record between said disks; a pick-up arm mechanism including a vertical rod pivoted from said frame about a vertical axis, said rod being mounted a spaced distance from said axis of rotation of said records, a vertically reciprocable carrier means travelling on said rod and pivotable therewith, and a pick-up arm pivoted from said carrier means about a horizontal axis and carrying a pair of pick-up cartridges, one operatively disposed upwardly and the other operatively disposed downwardly; sequence control means defining at least one preselected playing sequence for any of the several sides of said records and including a first cam means, a first follower means coacting with said first cam means and interconnected to said reciprocable carrier means for controlling the vertical travel of said carrier means, and a second follower means coacting with said first cam means and interconnected to said motor drive means for controlling the direction of rotation of said motor drive means in relation to the vertical position of said carrier means; positioning means for intermittently pivoting said vertical rod including a second cam means and a third follower means coacting with said second cam means and intermittently applying a turning moment to said vertical rod; and means for actuating said first and second cams in timed relationship to one another.

4. An automatic phonograph record player and changer comprising a supporting frame; record support and drive means for simultaneously rotating a plurality of fixedly spaced records in either of two directions about a common vertical axis of rotation including motor drive means having two spaced contra-rotating driving spindles, a rotatable shaft mounted on said frame in fixed spaced relationship to said spindles, flywheel means carried on said shaft, a reciprocably pivotable lever means mounted on said frame and having a first and a second extreme position, a first idler wheel carried on said lever means and engaging in rolling contact both said flywheel means and one of said spindles at the first of said extreme positions and disengaging from said rolling contact at the second of said extreme positions, a second idler wheel carried on said pivotable lever means and engaging in rolling contact both said flywheel means and the other of said spindles at the second of said extreme positions and disengaging from said rolling contact at the first of said extreme positions, a first top drive disk carried on said rotatable shaft, a first lower drive disk rotatably mounted on said frame coaxially with said rotatable shaft and a spaced distance apart therefrom, a plurality of record drive disk assemblies rotatably mounted therebetween substantially coaxially with said first top drive disk and said first lower drive disk, each assembly including a second top record drive disk supported from said frame and having an upwardly extending stub shaft, a second lower drive disk shiftable axially on said stub shaft, and means for restraining relative rotation between said second top drive disk and said second lower drive disk, spring means for normally urging each of said lower drive disks into operative contact with the corresponding one of said top drive disks disposed intermediately adjacent thereto, lever means for simultaneously retracting said lower drive disks against said spring means to permit insertion of a record between said normally contacting disks; a pick-up arm mechanism including a vertical rod pivoted from said frame about a vertical axis, said rod being mounted a spaced distance from said axis of rotation of said records, a vertically reciprocable carrier means travelling on said rod and pivotable therewith, and a pick-up arm pivoted from said carrier means about a horizontal axis and carrying a pair of pick-up cartridges, one operatively disposed upwardly and the other operatively disposed downwardly; sequence control means defining a plurality of preselected record playing sequences for any of the several sides of said records and including a unidirectionally driven cam shaft supported from said frame, a first set of cams each developed for a particular record playing sequence, said set of cams being driven by said cam shaft and axially shiftable thereupon, a corresponding second set of cams driven by said cam shaft and axially shiftable thereupon in fixed relation to said first set of cams, lever means for axially shifting said first and second sets of cams, a first follower means coacting with one of said first set of cams, linkage means converting movement of said first follower means into vertical motion of said carrier means, a second follower means coacting with one of said second set of cams, spring link means including a tubular rod connected to said second follower means, a reciprocable rod within said tubular rod connected to said reciprocably pivotable lever means, a pair of opposed spring means each bearing upon both said tubular rod and said reciprocable rod for normally urging said rods into a fixed position relative to one another, latch means for imparting controlled relative movement between said tubular rod and said reciprocable rod, and means for unlatching said latch means; positioning means for intermittently pivoting said vertical rod; and means for actuating said positioning means and said sequence control means in timed relationship to one another.

5. An automatic phonograph record player and changer comprising a supporting frame; a record support and drive means for simultaneously rotating a plurality of fixedly spaced records in either of two directions about a common vertical axis of rotation including motor means having two spaced contra-rotating driving spindles, a rotatable shaft mounted on said frame in fixed spaced relationship to said spindles, flywheel means carried on said shaft, a reciprocably pivotable lever means mounted on said frame and having a first and a second extreme position, a first idler wheel carried on said lever means and engaging in rolling contact both said flywheel means means and one of said spindles at the first of said extreme positions of said pivotable lever means and disengaging from said rolling contact at the second of said extreme positions, a second idler wheel carried on said pivotable lever means and engaging in rolling contact both said flywheel means and the other of said spindles at the second of said extreme positions and disengaging from said rolling contact at the first of said extreme positions, a first top disk carried on said rotatable shaft, a first lower drive disk rotatably mounted on said frame coaxially with said rotatable shaft and a spaced distance apart therefrom, a plurality of record drive disk assemblies rotatably mounted therebetween substantially coaxially with said first top drive disk and said first lower drive disk, each assembly including a second top record drive disk supported from said frame and having an upwardly extending stub shaft, a second lower drive disk axially shiftable on said stub shaft, and means for restraining relative rotation between said second top drive disk and said second lower drive disk, spring means for normally urging each of said lower drive disks into operative contact with the corresponding one of said top drive disks disposed immediately adjacent thereto, lever means operable only when said record player is stopped for simultaneously retracting said lower drive disks against said spring means to permit insertion of a record between said normally contacting disks; a pick-up arm mechanism including a vertical rod pivoted from said frame about a vertical axis, said rod being mounted a spaced distance from said axis of rotation of said records, a vertically reciprocable carrier means travelling on said rod and pivotable therewith, and a pick-up arm pivoted from said carrier means about a horizontal axis and carrying a pair of pick-up cartridges, one operatively disposed upwardly and the other operatively disposed downwardly; sequence control means defining a plurality of preselected playing sequences for any of the several sides of said records and including a unidirectionally driven cam shaft supported on said frame, a first set of cams each developed for a particular record playing sequence, said set of cams being driven by said cam shaft and axially shiftable thereupon, a corresponding second set of cams driven by said cam shaft and axially shiftable thereupon in fixed relation to said first set of cams, lever means operable only when said record player is stopped for axially shifting said first and second set of cams, a first follower means coacting with one of said first set of cams, linkage means converting movement of said first follower means into vertical motion of said carrier means, a second follower means coacting with one of said second set of cams, spring link means including a tubular rod connected to said second follower means, a reciprocable rod within said tubular rod connected to said reciprocably pivotable lever means, a pair of opposed spring means each bearing upon both said tubular rod and said reciprocable rod for normally urging said rods into a fixed position relative to one another, latch means for imparting controlled relative movement between said tubular rod and said reciprocable rod, and means for unlatching said latch means; positioning means for intermittently pivoting said vertical rod; means for actuating said positioning means and said sequence control means in timed relationship to one another, said means being driven by said record drive means; and switch means for starting operation of said record drive means, said switch means being operable only when said drive disks are in normally contacting position.

6. In an automatic phonograph record player and changer having a pick-up arm, a vertically reciprocable carrier means supporting said pick-up arm, and a reversible record drive mechanism simultaneously rotating a plurality of fixedly spaced records, a sequence control means defining a plurality of sequences for playing the several sides of said records in any preselected order comprising a unidirectionally driven cam shaft; a first set of cams each developed for a particular record playing sequence, said set of cams being driven by said cam shaft and axially shiftable thereupon; a corresponding second set of cams driven by said cam shaft and axially shiftable thereupon in fixed relation to said first set of cams; lever means for axially shifting said first and second set of cams; a first follower means coacting with one of said first set of cams; linkage means interconnecting said first follower means to said reciprocable carrier means for imparting a vertical motion to said carrier means; a second follower means coacting with one of said second set of cams; spring link means including a tubular rod connected to said second follower means, a reciprocable rod within said tubular rod connected to said reversible record drive mechanism, a pair of opposed spring means each bearing upon both said tubular rod and said reciprocable rod for normally urging said rods into a fixed position relative to one another, latch means for imparting controlled relative movement between said tubular rod and said reciprocable rod, and means for unlatching said latch means.

7. In an automatic phonograph record player and changer, a record drive and support mechanism for simultaneously rotating a plurality of fixedly spaced records in either of two directions about a common vertical axis comprising motor drive means rotatable in either of two directions; a plurality of drive disks arranged in pairs, said pairs being directly coupled in a series rotated by said motor drive means about said vertical axis, a pair of drive disks being provided for each of said records; separate spring means for normally urging at least one of said record drive disks of each of said pairs into operative engagement with the other disk of said pair; and lever means for retracting at least one of the record drive disks of each of said pairs against said spring means to permit insertion of a record between said normally contacting disks.

8. In an automatic phonograph record player and changer, a record drive and support mechanism for simultaneously rotating a plurality of fixedly spaced records in either of two directions about a common vertical axis comprising motor drive means having two spaced contra-rotating driving spindles; a rotatable shaft mounted in fixed spaced relationship to said spindles; a flywheel carried on said rotatable shaft; a reciprocably pivotable lever means having a first and second extreme position; a first idler wheel carried on said pivotable lever means and engaging in rolling contact both said flywheel and one of said spindles at the first of said extreme positions and disengaging from said rolling contact at the second of said extreme positions; a second idler wheel carried on said pivotable lever means and engaging in rolling contact both said flywheel and the other of said spindles at the second of said extreme positions and disengaging from said rolling contact at the first of said extreme positions; means defining a predetermined record playing sequence for reciprocably pivoting said pivotable lever means; a first top drive disk carried on said rotatable shaft; a first lower drive disk rotatably mounted coaxially with said rotatable shaft and a spaced distance apart therefrom; a plurality of record drive disk assemblies rotatably mounted therebetween substantially coaxially with said first top drive disk and said first lower drive disk, each assembly including a second top drive disk and having an upwardly extending stub shaft, a second lower drive disk axially shiftable on said stub shaft, and means for restraining relative rotation between said second top drive disk and said second lower drive disk; spring means for normally urging each of said lower drive disks into operative contact with the corresponding one of said top drive disks disposed immediately adjacent thereto; and lever means for simultaneously retracting said lower drive disks against said spring means to permit insertion of a record between said normally contacting drive disks.

9. In an automatic phonograph record player and changer a reversible record drive and support mechanism for simultaneously rotating a plurality of fixedly spaced records in either of two directions about a common vertical axis comprising motor drive means having two spaced contra-rotating driving spindles; a rotatable shaft mounted in fixed spaced relationship to said spindles; a flywheel carried on said rotatable shaft; record support means carried on said shaft; a reciprocably pivotable lever means having a first and a second extreme position; a first idler wheel carried on said pivotable lever means engaging in rolling contact both said flywheel and one of said spindles at the first of said extreme positions and disengaging from said rolling contact at the second of said extreme positions; a second idler wheel carried on said pivotable lever means engaging in rolling contact both said flywheel and the other of said spindles at the second of said extreme positions and disengaging from said rolling contact at the first of said extreme positions; means for reciprocably pivoting said pivotable lever means including cam means defining a predetermined record playing sequence, a follower means coacting with said cam means, a tubular rod connected to said follower means, a reciprocable rod within said tubular rod slidably pinned to said reciprocably pivotable lever means, a pair of opposed first spring means each bearing upon both said tubular rod and said reciprocable rod for normally urging said rods into a fixed position relative to one another, latch means for imparting relative movement between said tubular rod and said reciprocable rod, and means for unlatching said latch means; and a second spring means urging said reciprocably pivotable lever means toward either of said extreme positions.

10. In an automatic record player and changer having a plurality of records supported in fixed spaced relationship to one another and driven in either of two directions about a common vertical axis, a pick-up arm assembly comprising a vertical rod pivotable about a vertical axis, a vertically reciprocable carrier means travelling on said rod and pivotable therewith, a pick-up arm pivoted from said carrier means about a horizontal axis, spring means yieldably holding said pick-up arm in a horizontal plane, a pair of pick-up cartridges carried by said pick-up arm, one operatively disposed upwardly and one operatively disposed downwardly.

11. In an automatic record player and changer having a plurality of records supported in fixed spaced relationship to one another and driven in either of two directions about a common vertical axis, a pick-up arm assembly and control means therefor comprising a vertical rod pivotable about a vertical axis; a vertically reciprocable carrier means travelling on said rod and pivotable therewith; a pick-up arm pivoted from said carrier means about a horizontal axis; spring means yieldably holding said pick-up arm in a horizontal plane; a pair of pick-up cartridges carried by said pick-up arm, one operatively disposed upwardly and one operatively disposed downwardly; means for controlling the vertical travel of said carrier means including cam means defining a predetermined record playing sequence, lever means pivoted by said cam means and carrying a gear sector, a rotatable shaft carrying a wheel and a pinion gear, said pinion gear being in operative engagement with said gear sector, flexible tension means having two ends, one of said ends being affixed to said wheel and the other end being secured to said carrier means, guide means controlling the path of said tension means, said tension means training around the periphery of said wheel and depending over said guide means in a fall to said carrier means.

12. In an automatic record player and changer having a plurality of records supported in fixed spaced relationship to one another and driven in either of two directions about a common vertical axis, a pick-up arm assembly and control means therefor comprising a vertical rod pivotable about a vertical axis; a vertically reciprocable carrier means travelling on said rod and pivotable therewith; a pick-up arm pivoted from said carrier means about a horizontal axis; spring means yieldably holding said pick-up arm in a horizontal plane; a pair of pick-up cartridges carried by said pick-up arm, one operatively disposed upwardly and one operatively disposed downwardly; means for controlling the vertical travel of said carrier means including cam means defining a predetermined record playing sequence, a lever means pivoted by said cam means and carrying a gear sector, a rotatable shaft carrying a wheel and a pinion gear, said pinion gear being in operative engagement with said gear sector; flexible tension means having two ends, one of said ends being affixed to said wheel and the other being affixed to said carrier means, guide means controlling the path of said tension means, said tension means training around the periphery of said wheel and depending over said guide means in a fall to said carrier means; and positioning means for intermittently pivoting said carrier means radially with respect to the axis of rotation of said records.

13. In an automatic record player and changer a reversible record drive mechanism comprising a supporting frame; motor drive means having a unidirectionally rotatable spindle; a flywheel mounted on said frame in fixed spaced relation to said spindle; a first lever means reciprocably pivotable from said frame and having a first and a second extreme position; a first idler wheel carried on said lever means and engaging in rolling contact both said flywheel and said spindle at the first of said extreme positions and disengaging from said rolling contact at the second of said extreme positions; a second lever means pivoted from said frame; a second idler wheel carried on said second lever means; a third idler wheel carried on said first lever means disposed to engage both said flywheel and said second idler wheel in rolling contact while simultaneously urging said second idler wheel into rolling contact with said spindle at the second of said extreme positions and disengaging from said rolling contact at the first of said extreme positions; means for reciprocably pivoting said lever means in response to a predetermined record playing sequence.

14. In an automatic record player and changer having a pick-up arm mounted on a vertically reciprocable carrier means, means for controlling the vertical travel of said carrier means comprising a supporting frame; cam means determining a record playing sequence; lever means mounted on said frame and pivoted by said cam means, said lever means carrying a first pulley means; a second pulley means mounted on said frame; flexible tension means having two ends, said tension means being affixed at one end to said lever means and at the other end to said carrier means; guide means controlling the path of said tension means, said tension means training from said lever means around said first and second pulley means to form a multiple part pulley system, said tension means then depending over said guide means in a fall to said carrier means.

15. In an automatic phonograph record player and changer, a mechanism for intermittently driving a rotatable shaft through a single complete revolution comprising a supporting frame; motor means having a driving spindle; a first lever means pivoted from said frame and carrying pivoted thereon a second lever means; an idler wheel rotatably mounted on said second lever means; a driving wheel rotatably mounted on said frame a spaced distance apart from said spindle; spring means urging said idler wheel into rolling contact with both said driving wheel and said spindle; cam means driven by said driving wheel and mounted on said rotatable shaft; a follower means reciprocably pivotable by said cam means from a first extreme position to a second extreme position; a first latch means carried on said follower means normally urging said first lever to pivot said idler wheel out of contact with said driving wheel and said spindle in opposition to said spring means; means for intermittently releasing said first latch means enabling said idler wheel to contact said spindle and said driving wheel; a second latch means restraining said follower means in said first extreme position thereby holding said first latch means inoperative; said cam means unlatching said second latch means at the end of a single complete revolution of said cam means whereupon said follower means assumes its second extreme position permitting said first latch means to suddenly move said idler wheel out of contact with said driving wheel and said spindle.

16. In an automatic record player and changer having at least one record supported with both plaping faces exposed, a pick-up arm carrier means reciprocable perpendicularly with respect to said record playing faces, a pick-up arm carried on said carrier means and mounted pivotably about a normal position parallel with said record playing faces, and control means for positioning said carrier means in relation to said playing faces, a combination switch and spring means for yieldably urging said pick-up arm against one of said playing faces at a time in cooperation with said control means and for interrupting an electrical circuit in response to any deflection of said spring means comprising a pair of opposed electrically interconnected and electrically conductive leaf springs, each having a fixed end and a free end and each being secured at said fixed end to said pick-up arm with said free end normally bearing against said carrier means, and a pair of electrical contacts each positioned on said pick-up arm carrier to engage the free end of the corresponding one of said leaf springs only when said pick-up arm is in said normal position.

17. In an automatic record player and changer, a record support and drive means comprising a plurality of pairs of record drive disks simultaneously rotatable about a common axis, the first drive disk of each of said pairs being mounted in fixed spaced relation to each other along said axis and the second drive disk of each of said pairs being shiftable axially along said axis, separate coil spring means bearing against the second drive disk of each of said pairs and yieldably urging said second drive disk into engagement with the first drive disk of said pair, each of said spring means also bearing upon the immediately adjacent first drive disk of another of said pairs and each being unidirectionally wound to develop torque between said drive disks against which it bears, and a plurality of coupling means each interconnecting the second drive disk of one of said pairs with the immediately adjacent first drive disk of another of said pairs and including at least one driving pin depending from said second drive disk and a coupling plate slidably attached to the corresponding one of said first drive disks receiving said depending pin in a slot extending radially outwardly from said common axis of rotation.

References Cited in the file of this patent

UNITED STATES PATENTS

| | | |
|---|---|---|
| 1,775,510 | Caputo | Sept. 9, 1930 |
| 2,175,142 | Andres | Oct. 3, 1939 |
| 2,601,986 | James et al. | July 1, 1952 |
| 2,646,688 | Slough | July 28, 1953 |
| 2,905,475 | Cheeseboro | Sept. 22, 1959 |
| 2,960,340 | Seidel et al. | Nov. 15, 1960 |

FOREIGN PATENTS

| | | |
|---|---|---|
| A19613 VIII d/42g | Germany | Oct. 4, 1956 |
| 333,236 | Switzerland | Nov. 29, 1958 |